United States Patent [19]
Bohm

[11] Patent Number: 6,021,663
[45] Date of Patent: Feb. 8, 2000

[54] PROCESS AND LEAK DETECTOR FOR INSPECTING A PLURALITY OF SIMILAR TEST BODIES FOR LEAKS

[75] Inventor: Thomas Bohm, Cologne, Germany

[73] Assignee: Leybold Vakuum GmbH, Cologne, Germany

[21] Appl. No.: 09/269,128

[22] PCT Filed: Jul. 23, 1997

[86] PCT No.: PCT/EP97/03983

§ 371 Date: Mar. 19, 1999

§ 102(e) Date: Mar. 19, 1999

[87] PCT Pub. No.: WO98/12529

PCT Pub. Date: Mar. 26, 1998

[30] Foreign Application Priority Data

Sep. 20, 1996 [DE] Germany ............... 196 38 506

[51] Int. Cl.[7] ............................................. G01M 3/04
[52] U.S. Cl. ............................................. 73/40.7
[58] Field of Search ............................. 73/40, 40.7

[56] References Cited

U.S. PATENT DOCUMENTS

| | | |
|---|---|---|
| 1,711,000 | 4/1929 | Short et al. . |
| 4,773,256 | 9/1988 | Saulgeot ................................ 73/40.7 |
| 4,775,426 | 10/1988 | Murley et al. . |
| 4,776,207 | 10/1988 | Holme .................................. 73/40.7 |
| 5,537,857 | 7/1996 | Grosse Bley ........................ 73/40.7 |
| 5,900,537 | 5/1999 | Bohm et al. ......................... 73/40.7 |

FOREIGN PATENT DOCUMENTS

| | | |
|---|---|---|
| 0 119 365 | 9/1984 | European Pat. Off. . |
| 0 816 042 | 1/1998 | European Pat. Off. . |
| 2 256 792 | 9/1978 | France . |
| 2 614 814 | 11/1988 | France . |
| 24 54 979 | 7/1975 | Germany . |
| 195 04 278 | 8/1996 | Germany ............................. 73/40.7 |
| 1078781 | 8/1967 | United Kingdom . |
| 17655 | 6/1995 | WIPO ................................. 73/40.7 |
| 24828 | 8/1996 | WIPO ................................. 73/40.7 |

OTHER PUBLICATIONS

Patents Abstracts of Japan vol. 007, No. 237 (M–250), (Oct. 21, 1983) & JP 58 125328 A (Nissan Jidosha KK) (Jul. 26, 1983).

D.G. Mahoney: "Expanded–Range, Sealed Parts Leak Testing Technology for Helium Mass Spectrometer Leak Detection", Journal of Vaccuum Science and Technology, Part A., (Aug. 1994) pp. 1740–1743.

*Primary Examiner*—Daniel S. Larkin
*Attorney, Agent, or Firm*—Wall Marjama Bilinski & Burr

[57] ABSTRACT

A process is disclosed for inspecting a plurality of similar test bodies for leaks. The test bodies are first evacuated by a fore-vacuum vacuum pump (evacuation mode), down to a pressure $P_u$, selected to ensure that the maximum admissible pressure in the mass spectrometer (5) is not exceeded when the measurement mode is switched on, and then the evacuation mode is switched to a measurement mode by opening the second valve (16). In order to shorten evacuation times, a learning process is used to determine the optimum switching pressure $P_{u\ opt}$.

2 Claims, 1 Drawing Sheet

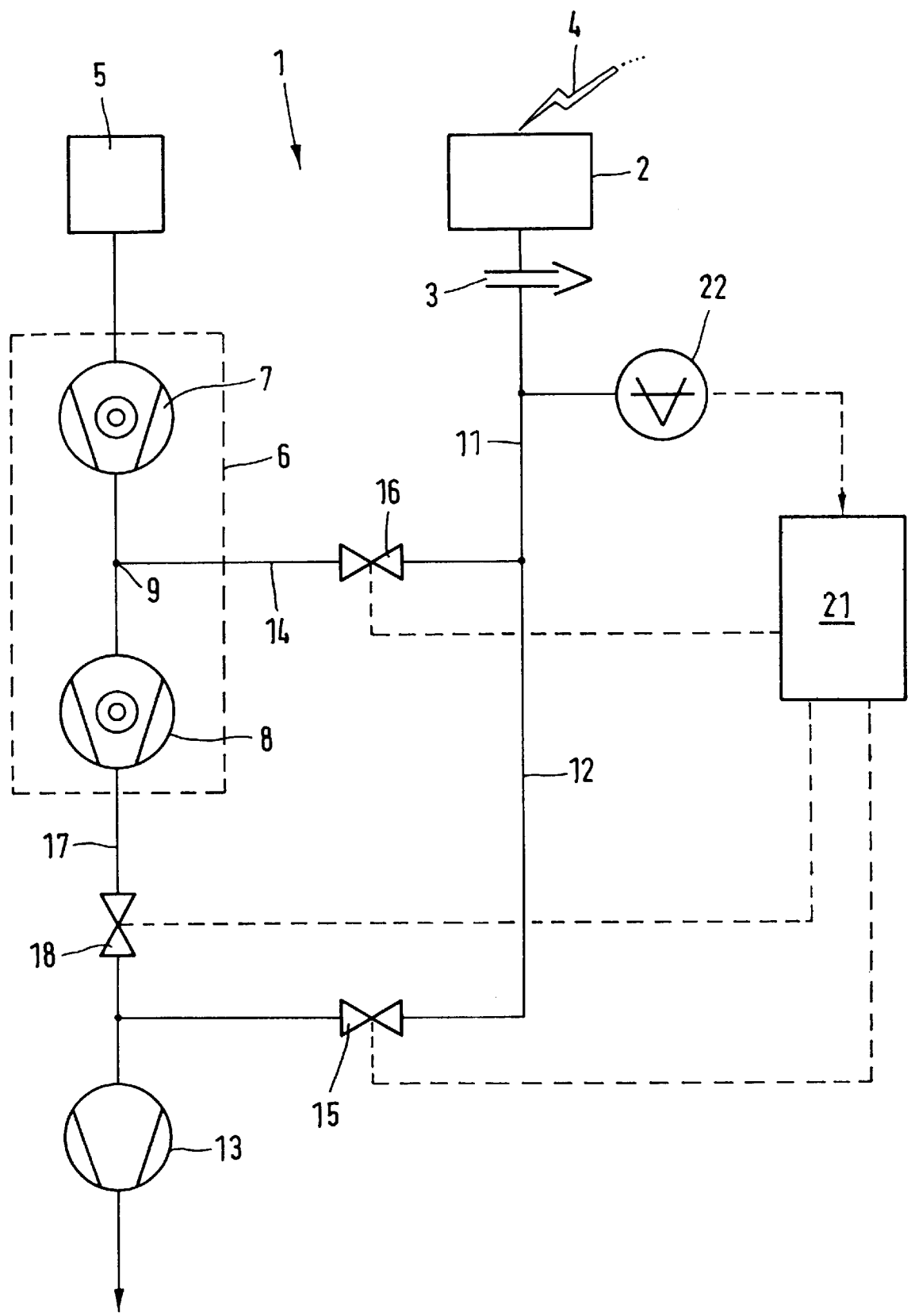

PROCESS AND LEAK DETECTOR FOR INSPECTING A PLURALITY OF SIMILAR TEST BODIES FOR LEAKS

BACKGROUND OF THE INVENTION

In order to improve the quality of products, in particular series manufactured products with hollow spaces (vessels, housings, heat exchangers, condensers, etc.), the deployment of helium leak detection methods is becoming more and more popular so as to determine and sort out faulty products at an early stage. For reasons of time and cost, the cycle time (time required to test each test body) should be as short as possible.

In a vacuum leak detection process, a light gas, especially helium, is employed as the test gas. In the case of the presence of a leak, this enters into the evacuated test body and it is recorded with the aid of a mass spectrometer. The test body is evacuated with the aid of a fore-vacuum pump accommodated in the leak detector. A high-vacuum pump serves to evacuate the mass spectrometer, since the operating pressure of a mass spectrometer must not exceed a maximum of $10^{-4}$ mbar. One test body at a time is evacuated, and after the pressure ($P_u$)(switchover pressure) has been attained, the instrument switches over from the evacuation mode to the measurement mode. $P_u$ is the pressure that prevails at the intermediate inlet of the high-vacuum pump. It must be selected to be adequately low, so that the pressure in the mass spectrometer will not exceed the maximum admissible operating pressure.

SUMMARY OF THE INVENTION

To be on the safe side, the pressure ($P_u$) is selected to be very low in order to avoid endangering the operation of the mass spectrometer under all circumstances. This approach has the effect that the switchover from the evacuation mode to the measurement mode can only be effected after a relatively long evacuation time has elapsed. This applies in particular to the younger generation of leak detectors in which dry (oil-free) backing pumps like, for example, diaphragm pumps, scroll pumps, or the like are employed having at low pressures (e.g. >5 mbar) a relatively low pumping capacity.

It is the task of the present invention to shorten the evacuation time for the test bodies which chiefly affect the cycle time.

The present invention is based on the realization that, in the case of leak testing a plurality of similar test bodies, a higher switchover pressure ($P_u$) may be selected as previously selected for the reason of being on the safe side. An earlier switchover from the evacuation mode to the measurement mode does not only offer the advantage of being able to commence with the leak detection process earlier; moreover, immediately after the switchover has occurred, the high pumping capacity of the high-vacuum stage following downstream of the intermediate inlet becomes effective so that the evacuation time itself is considerably shortened. Because of the similarity of the test bodies a learning process may be applied, through which an optimum switchover pressure ($P_{u\ opt}$) may be determined.

DESCRIPTION OF THE INVENTION

Details of the present invention shall be explained by referring the drawing figure of a schematically depicted leak detector designed according to the present invention.

BRIEF DESCRIPTION OF THE DRAWINGS

The depicted leak detector 1 is equipped with a connection for a test body 2 (test port 3). The test body is, for example, sprayed from the outside with helium (spray gun 4). If the test body has a leak, helium will enter into the leak detector 1 and will be recorded with the aid of the mass spectrometer 5. Instead of test body 2, a chamber in which several test bodies have been accommodated, may be connected to test port 3.

A high-vacuum pump 6 having two stages 7 and 8 as well as an intermediate inlet 9 is employed for the generation of the necessary operating pressure in the spectrometer 5. Two separate pumps may be employed; preferable, however, is the deployment of a two-stage friction pump, a turbomolecular pump, for example, which is equipped with an intermediate inlet 9.

The stage 7 of the high-vacuum pump 6 has a relatively low compression for lighter gases, so that any helium entering through intermediate inlet 9 may enter upstream through stage 7 into the mass spectrometer 5 (counter flow principle).

The test port 3 is linked via line sections 11, 12 to the fore-vacuum pump 13, as well as line sections 11, 14 to the intermediate inlet 9. Located in line sections 12 and 14 are valves 15 and 16 respectively. Also, the discharge port of the high-vacuum pump 6 or that of pumping stage 8 is linked to the fore-vacuum pump 13 by means of line section 17 incorporating the valve 18. Line section 12 opens out into line section 17 between the valve 18 and the fore-vacuum pump 13.

A control unit 21, to which the signals from pressure gauge 22 are routed, serves the purpose of controlling the leak detection process. Said pressure gauge measures the pressure in the area of test port 3. Only the control lines leading to valves 15, 16,nd 18 are depicted.

An inspection of the test body 2 for the presence of leaks is performed in such a manner that valve 15 is opened first. Thereby, the test body 2 is evacuated. The evacuation continues until the pressure determined by gauge 22 has attained the switchover pressure ($P_u$). Thereafter, the leak detector switches over into the measurement mode by opening valves 16 and 18. If the test body 2 has a leak, helium which has entered into the test body passes through line section 14 and the pump stage 7 into the mass spectrometer 5 and it is recorded there.

To set up an optimum switchover pressure($P_{u\ opt}$) the following learning process is applied: during the inspection of the first test body as to the presence of leaks, a relatively low switchover pressure ($P_u$) is selected—this being the state-of-the-art. This pressure is considerably lower than $P_{u\ max}$ where a switchover into the measurement mode may already still be performed without the pressure in the mass spectrometer increasing above its critical limit.

Each time after switching over from the evacuation mode into the measurement mode, the dropping of the pressure is determined with the aid of gauge 22. During the inspection of the first test body, this step will confirm that $P_u$ is far below $P_{u\ max}$.

During the inspection of the next test body a higher (higher by 50%, for example) switchover pressure ($P_u$) is selected. If, during the subsequent pressure comparison between $P_u$ and $P_{u\ max}$, it is again determined that $P_u$ is still far below $P_{u\ max}$, then $P_u$ is increased further during the inspection of the third test body. Only when it is found that the pressure after switching over amounts to 20% to 70% of the pressure of $P_{u\ max}$, the pressure $P_u$ is not increased any further. This pressure for $P_u$ is then the desired optimum pressure ($P_{u\ opt}$) for switching over from the evacuation mode into the measurement mode.

For this learning method, it is required that the test bodies which are to be analysed be as identical as possible. Generally, in the case of leaktight test bodies, the pressure will, owing to the higher pumping capacity of the turbomolecular lamp TMP after switching over, drop very rapidly below the maximum admissible pressure in the mass spectrometer so that very early switching is possible. When defining the pressure levels, it needs to be taken into account that the inlet pressure will not only depend on the gas coming from the test body, but the gas possibly may also come from a gross leak. In the latter case, the pressure, after the switching over, will only drop to a limited[1]) level which results from the ratio $_{QGross\ leak}$ (leak rate of the gross leak) and $S_{TMP}$ (pumping capacity of the turbomolecular pump) and which may not increase over the maximum admissible pressure in the mass spectrometer.

[1]) Translator's note: The German text includes the word "endliche" where "endlichen" would be appropriate. Therefore the latter has been assumed for the purpose of this translation.

The present invention allows the adaptation of the leak detection process to the characteristics of the test bodies without involved prior analyses.

What is claimed is:

1. A process for inspecting a plurality of similar test bodies in which a test port (3) is connected to said test bodies and said test bodies are linked via a first line (12) and a first valve (15) to a fore-vacuum pump (13), the inlet of which is further connected to the outlet of a two stage high vacuum pump (6), the inlet of said high vacuum pump (6) in turn, is connected to a mass spectrometer (5), said high vacuum pump (6) having an intermediate inlet (9) between stages that is further connected via a second line (14) and a second valve (16) to said test port and wherein said outlet of the high vacuum pump is connected to the fore vacuum pump (13) by a third line (17) and a third valve (18), said process including the steps of:

instituting an evacuating mode by closing said second and third valves and opening said first valve to connect said fore vacuum pump to said test port whereby said test bodies are evacuated, switching from said evacuating mode to a measurement mode by opening said second and third valves, controlling the initial evacuating pressure ($P_u$) so that the system pressure during the measuring mode does not exceed the maximum admissible pressure ($P_{u\ max}$) of said mass spectrometer, and repeating the above noted steps and determining the optimum initial evacuating pressure such that said maximum admissible pressure ($P_{u\ max}$) is not exceeded after the modes are switched.

2. The process of claim 1, wherein switching from the evacuation mode to the measuring mode is effected for a first test body at an initial pressure ($P_u$) that is significantly lower than the maximum admissible pressure of the mass spectrometer ($P_{u\ max}$) and repeating the noted steps at subsequently higher pressures ($P_u$), observing each subsequently higher pressures using a pressure gauge, and increasing each subsequent pressure ($P_u$) until a desired optimum pressure ($P_{u\ opt}$) is observed which is between 20% and 70% of the maximum admissible pressure ($P_{u\ max}$).

* * * * *